(12) United States Patent
Lowther

(10) Patent No.: US 8,002,153 B2
(45) Date of Patent: Aug. 23, 2011

(54) POWDER FOOD DISPENSER

(76) Inventor: Kristine A. Lowther, Mechanicsburg, PA (US)

( * ) Notice: Subject to any disclaimer, the term of this patent is extended or adjusted under 35 U.S.C. 154(b) by 492 days.

(21) Appl. No.: 12/207,863

(22) Filed: Sep. 10, 2008

(65) Prior Publication Data
US 2010/0059542 A1    Mar. 11, 2010

(51) Int. Cl.
*G01F 11/10* (2006.01)
(52) U.S. Cl. ......... 222/361; 222/1; 222/158; 222/185.1; 222/359; 222/368
(58) Field of Classification Search .......... 222/359–361, 222/367–370, 305, 185.1, 561, 410, 1, 158, 222/425–426, 153.01, 153.13, 436
See application file for complete search history.

(56) References Cited

U.S. PATENT DOCUMENTS

| | | | |
|---|---|---|---|
| 3,531,019 A | 9/1970 | Rodgers | |
| 4,004,719 A * | 1/1977 | Weitzman | 222/366 |
| 4,059,181 A | 11/1977 | Greenfield, Jr. et al. | |
| D252,655 S | 8/1979 | Dibling | |
| D259,319 S | 5/1981 | Ciuffetti | |
| 4,378,078 A | 3/1983 | Daniels | |
| 4,403,715 A * | 9/1983 | Ludovissie | 222/361 |
| 4,440,322 A * | 4/1984 | Henry | 222/153.13 |
| 4,493,442 A | 1/1985 | Hanson, Jr. | |
| 4,635,829 A * | 1/1987 | Brittingham, Jr. | 222/278 |
| D292,358 S | 10/1987 | Cockrell | |
| 4,850,515 A | 7/1989 | Cleland | |
| 5,090,593 A | 2/1992 | Ejike | |
| 5,143,126 A * | 9/1992 | Boesch et al. | 141/1 |
| D336,015 S | 6/1993 | Guzewicz | |
| D340,839 S | 11/1993 | Held | |
| 5,467,903 A | 11/1995 | Sorensen et al. | |
| 5,570,816 A | 11/1996 | LaBarbera, Jr. | |
| 5,890,627 A | 4/1999 | Storey | |
| 5,908,144 A | 6/1999 | Dalton | |
| 6,145,709 A * | 11/2000 | Hogan et al. | 222/278 |
| 6,315,170 B1 | 11/2001 | Thomson et al. | |
| 6,431,407 B1 * | 8/2002 | Hogan et al. | 222/278 |
| D476,855 S | 7/2003 | Green | |
| 2002/0070235 A1 * | 6/2002 | Childers | 222/132 |
| 2004/0140240 A1 | 7/2004 | Ricotti | |
| 2006/0157463 A1 | 7/2006 | Wiele et al. | |
| 2007/0181613 A1 | 8/2007 | Ben-Shlomo et al. | |

FOREIGN PATENT DOCUMENTS

| | | |
|---|---|---|
| EP | 0069929 A2 | 1/1983 |
| GB | 0410298 A0 | 6/2004 |
| KR | 3074983 A | 9/2003 |
| WO | 9116145 A1 | 10/1991 |
| WO | 03053137 A1 | 7/2003 |

* cited by examiner

*Primary Examiner* — Frederick C. Nicolas
(74) *Attorney, Agent, or Firm* — McNees Wallace & Nurick LLC

(57) ABSTRACT

The present invention is a powder dispenser for dispensing predetermined amounts of a powder product. The powder dispenser includes a housing and a dispensing tube. The dispensing tube removes a predetermined amount of the powder product from the housing to be dispensed into a container. The dispensing tube includes recesses having a predetermined volume to control the amount of powder product dispensed. The housing includes a lower cavity for storing containers that receive the dispensed powder product.

11 Claims, 5 Drawing Sheets

POWDER FOOD DISPENSER

FIELD OF THE INVENTION

The present invention is generally to a dispensing apparatus, and more particularly to an apparatus for the controlled volumetric dispensing of a predetermined volume of dry, powdered or granular materials.

BACKGROUND OF THE INVENTION

Many types of dry, powdered or granular materials, in particular foodstuffs such as cereals, granular foods such as rice, and powdered foods such as infant formula are packaged for sale in bulk, multi-serving containers, from which a desired portion is removed as needed. Often, the desired portion is removed by scooping from the bulk packaged container, or alternatively, a portion may be poured from the container into a measuring device, such as a measuring cup or a graduated serving device, to then be dispensed to a container for final use.

While reference will be made herein to powdered material, it is understood that such term includes flowable materials such as cereals and granular foods as well as powdered foodstuffs and non-foodstuffs.

Such manner of dispending a desired volume or measured quantity of a powdered material is inconvenient, and often results in spilled material creating unsanitary conditions and inconsistent dispensed amounts. One application in which additional ease of known volumetric dispensing is desired is in infant food, commonly referred to as baby formula. Although baby formula is available in liquid, pre-mixed form, due to economy and ease of storage, many people purchase such formula as a dry powder to which water or milk is added to produce liquid formula. The dry powder baby formula is most frequently purchased in cylindrical containers having a removable lid, which provides no means to dispense a pre-measured amount. The dry powder baby formula is then removed from the container in pre-measured amounts by a measuring device and provided to the end use container.

The related art shows no apparatus for receiving a bulk powdered material for storage and dispensing directly therefrom a measured quantity of the powder material that addresses the limitations addressed above.

Therefore, what is needed is an improved apparatus for storage and dispensing of powder material in measured quantities. Ideally, the apparatus should dispense consistent measured quantities of a powder material without spillage or waste. The apparatus should be configured to dispense the powder material into an end-use container, such as a baby bottle.

SUMMARY OF THE INVENTION

According to a first embodiment of the invention, a powder dispenser for dispensing a predetermined volume of a powder product is disclosed. The powder dispenser includes a housing having an upper cavity and a lower cavity, a hopper at least partially defining a bottom surface of the upper cavity, an opening in the hopper, a tube housing comprising an top opening in fluid communication with the opening of the hopper and a bottom opening, and a dispensing tube disposed within the tube housing. The dispensing tube includes a plurality of recesses having a predetermined volume. The dispensing tube and tube housing are configured to dispense a predetermined volume of a powder product from the when the dispensing tube is withdrawn from the tube housing a predetermined distance.

According to a second embodiment of the invention, a method of dispensing a predetermined volume of a powder product is disclosed that includes providing a powder dispenser having a housing having an upper cavity and a lower cavity, a hopper at least partially defining a bottom surface of the upper cavity, an opening in the hopper, a tube housing comprising an top opening in fluid communication with the opening of the hopper and a bottom opening, and a dispensing tube disposed within the tube housing. The dispensing tube includes a plurality of recesses having a predetermined volume and a stop feature. The method further includes withdrawing the dispensing tube from the tube housing a first predetermined distance to dispense a first predetermined volume of a powder product from the powder dispenser.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

Figure 1:
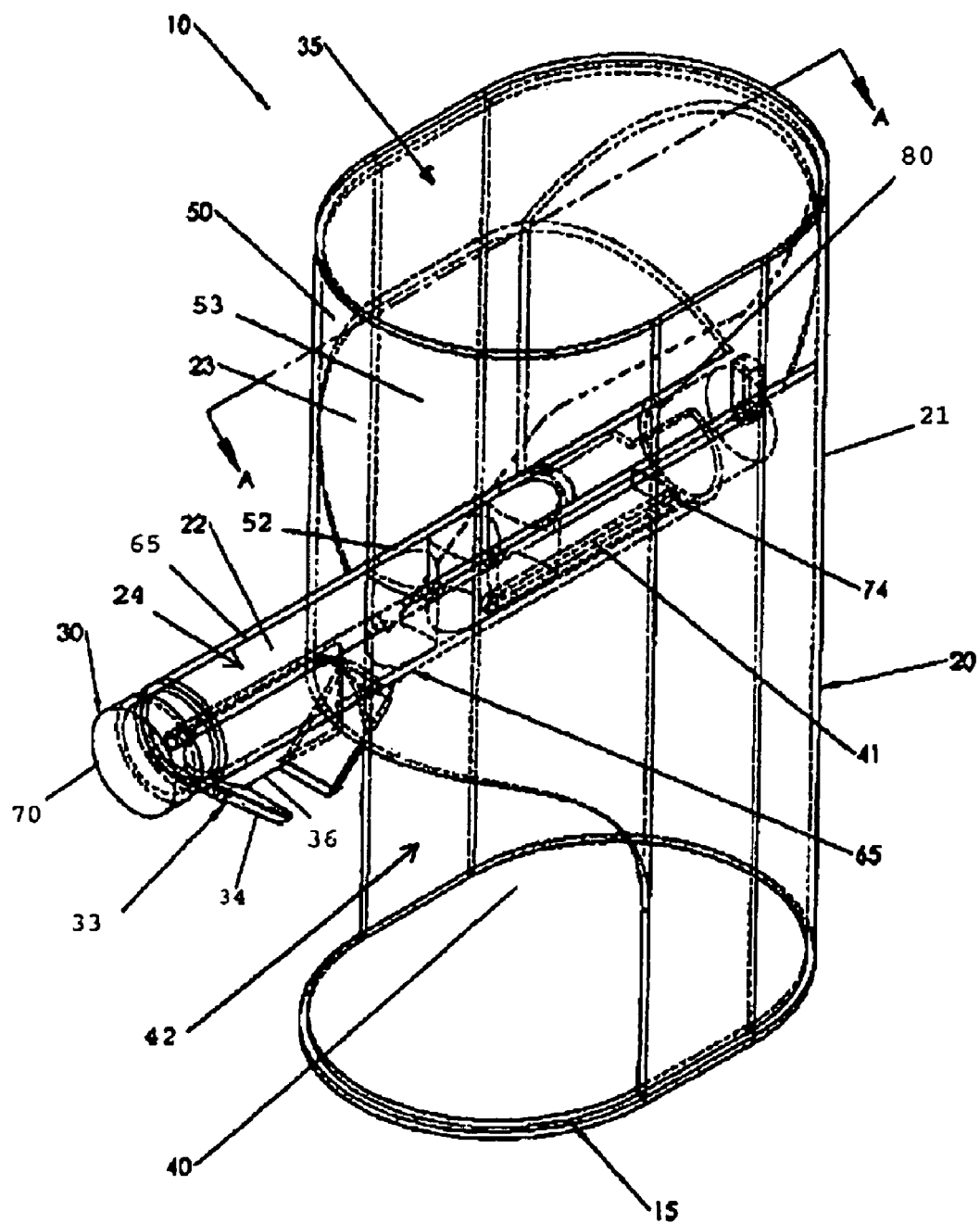
FIG. 1 is a perspective view of an exemplary power dispenser of the present invention.

While this invention is susceptible of embodiments in many different forms, there is shown in the drawings and will herein be described in detail, a preferred embodiment of the invention with the understanding that the present disclosure is to be considered as an exemplification of the principles of the invention and is not intended to limit the broad aspects of the invention to the embodiment illustrated.

Figure 2:
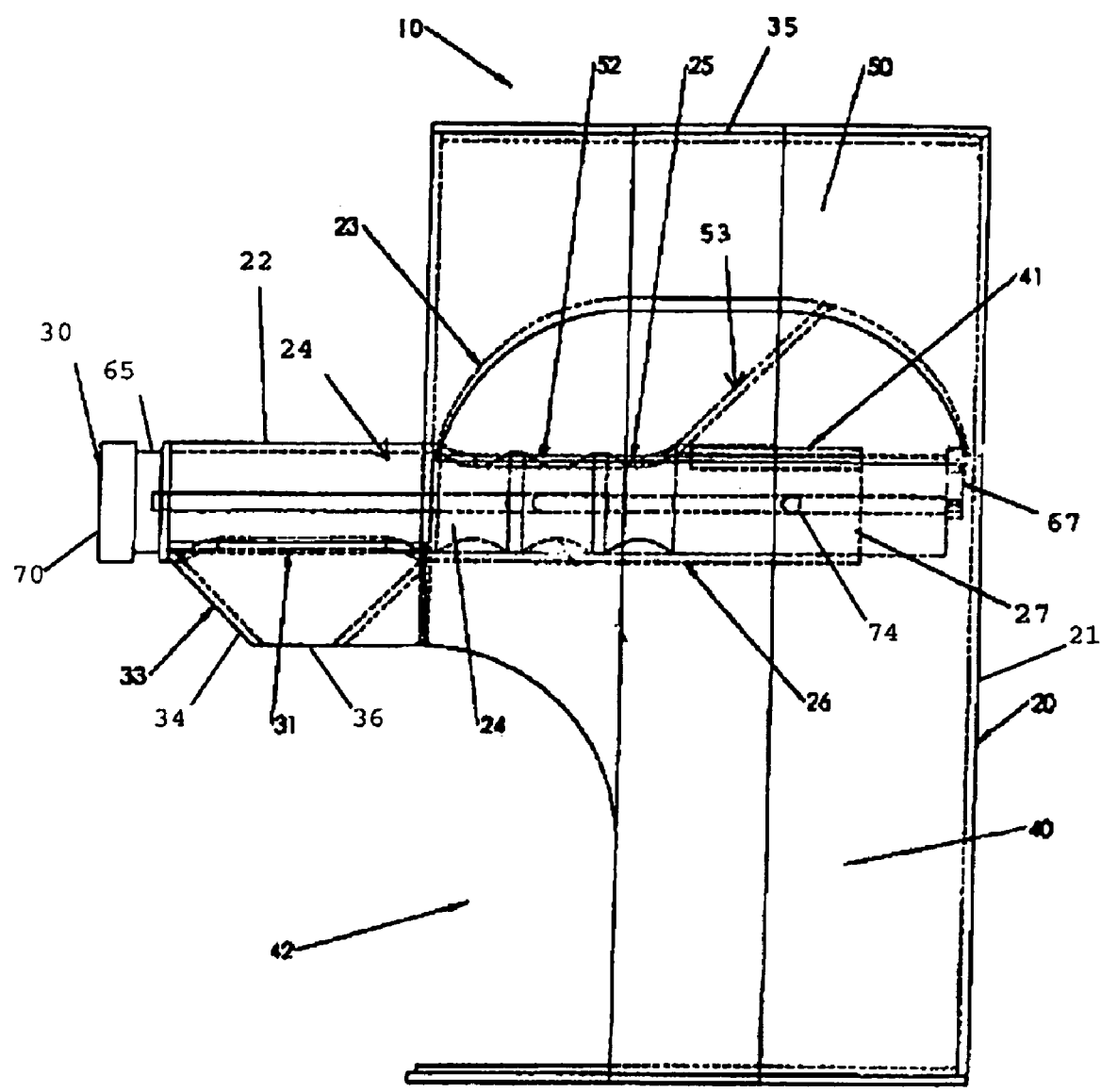
FIG. 2 is a cross sectional view of the powder dispenser of FIG. 1 taken along line A-A.

FIGS. 1 and 2 show an exemplary embodiment of a powder dispenser 10 for dispensing a predetermined measured amount of a powder product (not shown). The powder product may be a dry powder or granular material. For example, the powder product may be a powder food product. More particularly, the powder product may be a cereal, rice, or infant formula.

The powder dispenser 10 is formed of a polymeric material. The polymeric material may be a polypropylene, a polycarbonate resin or other similar polymeric material. For example, the powder dispenser 10 may be formed of Lexan™, a thermoplastic resin produced by the Saudi Basic Industries Corporation of Saudi Arabia. In one embodiment of the invention, the powder dispenser 10 may be formed of a clear or transparent polymer to permit an operator of the powder dispenser 10 to observe internal operation, including fill level, and to facilitate cleaning. In another embodiment, the powder dispenser 10 may be formed of a tinted or opaque polymer. In yet another embodiment, the powder dispenser 10 may be formed by any combination of clear, transparent, tinted and/or opaque polymers or other similar materials.

As shown in FIGS. 1 and 2, the powder dispenser 10 includes a housing 20, a dispensing tube 30 and a lid 35. The housing 20 includes an outer shell 21, a base 15, a tube housing 22, and a hopper 23. The outer shell 21 has a generally tubular geometry. In this exemplary embodiment, the outer shell 21 has a generally oval cross section, however, in other embodiments, the outer shell 21 may have a generally round, square, rectangular or other general shape as would be appreciated by one of ordinary skill in the art.

The base 15 has a generally oval, disk shape. In another embodiment, the base 15 may have a generally round, square, rectangular or other shape that conforms to the general cross sectional geometry of the housing 20. In one embodiment, the base 15 is formed as a separate component and attached to the housing 20 by thermal welding, gluing, or other similar attachment method. In another embodiment, the base 15 is integrally formed with the housing 20 during the forming of the housing 20. In yet another embodiment, the base 15 may be larger than the cross section of the housing 20 to provide a stabilizing base to increase the stability of the powder dispenser 10.

Referring again to FIGS. 1 and 2, the tube housing 22 divides the shell 21 into a lower cavity 40 and an upper cavity 50. The hopper 23 is disposed in the upper cavity 50. The hopper 23 includes a bottom surface 53. The hopper 23 is configured to direct a powder product (not shown) disposed in the upper cavity 50 to an opening 52 in the bottom surface 53 of the hopper 23. The hopper 23 is inclined towards the opening 52 to facilitate directing the flow of powder product towards the opening 52. The inclination of the hopper 23 may vary, and may be selected based on the flowability of the powder product or range of powder products intended for use with the powder dispenser 10.

The lower cavity 40 includes an opening 42. The lower cavity 40 may be used to store containers (not shown), which may be filled by the powder dispenser 10. For example, the lower cavity 40 may be used to store baby formula bottles to be filled with a powder baby formula. The opening 42 may vary in size and shape based on the range of containers intended for use with the powder dispenser 10.

Figure 3:
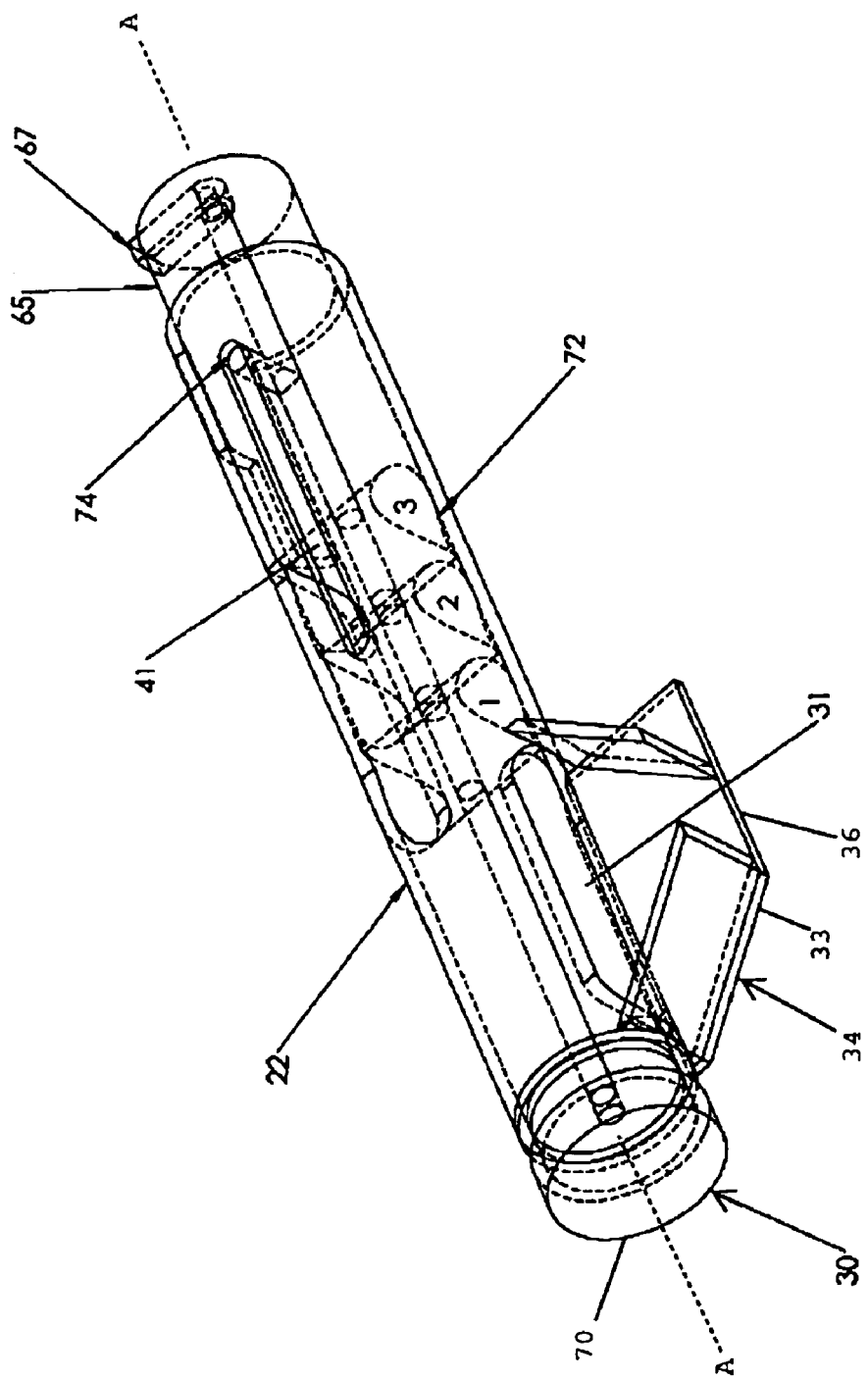
FIG. 3 is a perspective view of the tube housing and dispensing tube of FIG. 1.
Figure 4:
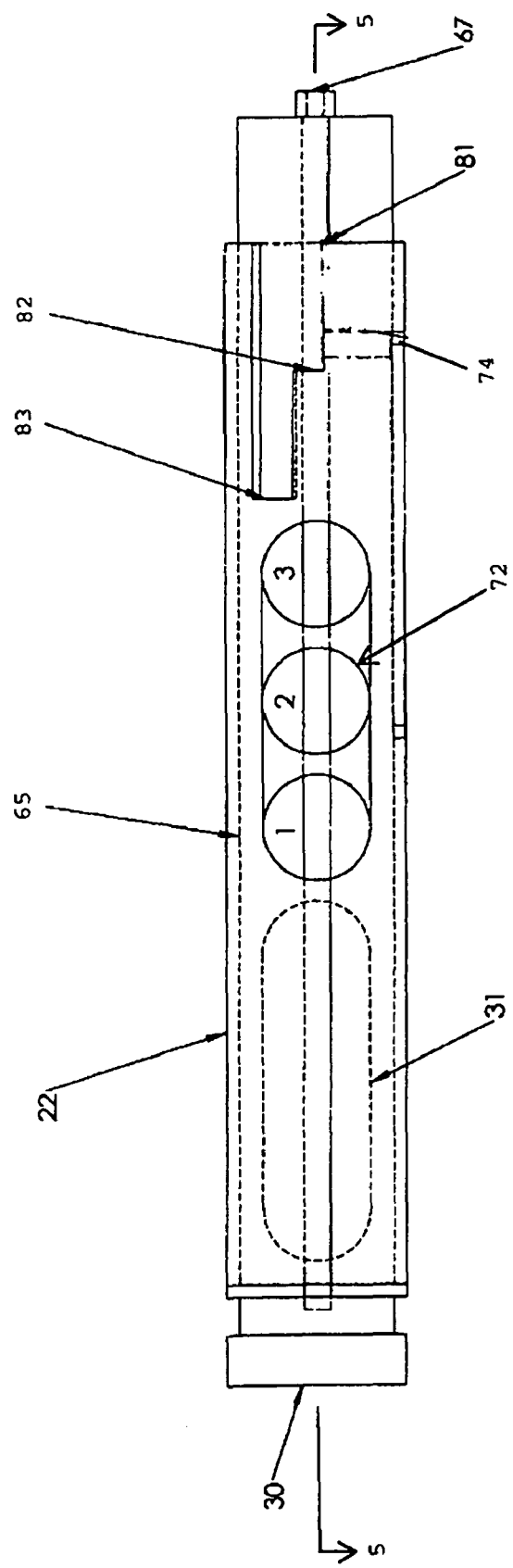
FIG. 4 is a top view of the tube housing and dispensing tube of FIG. 1.
Figure 5:
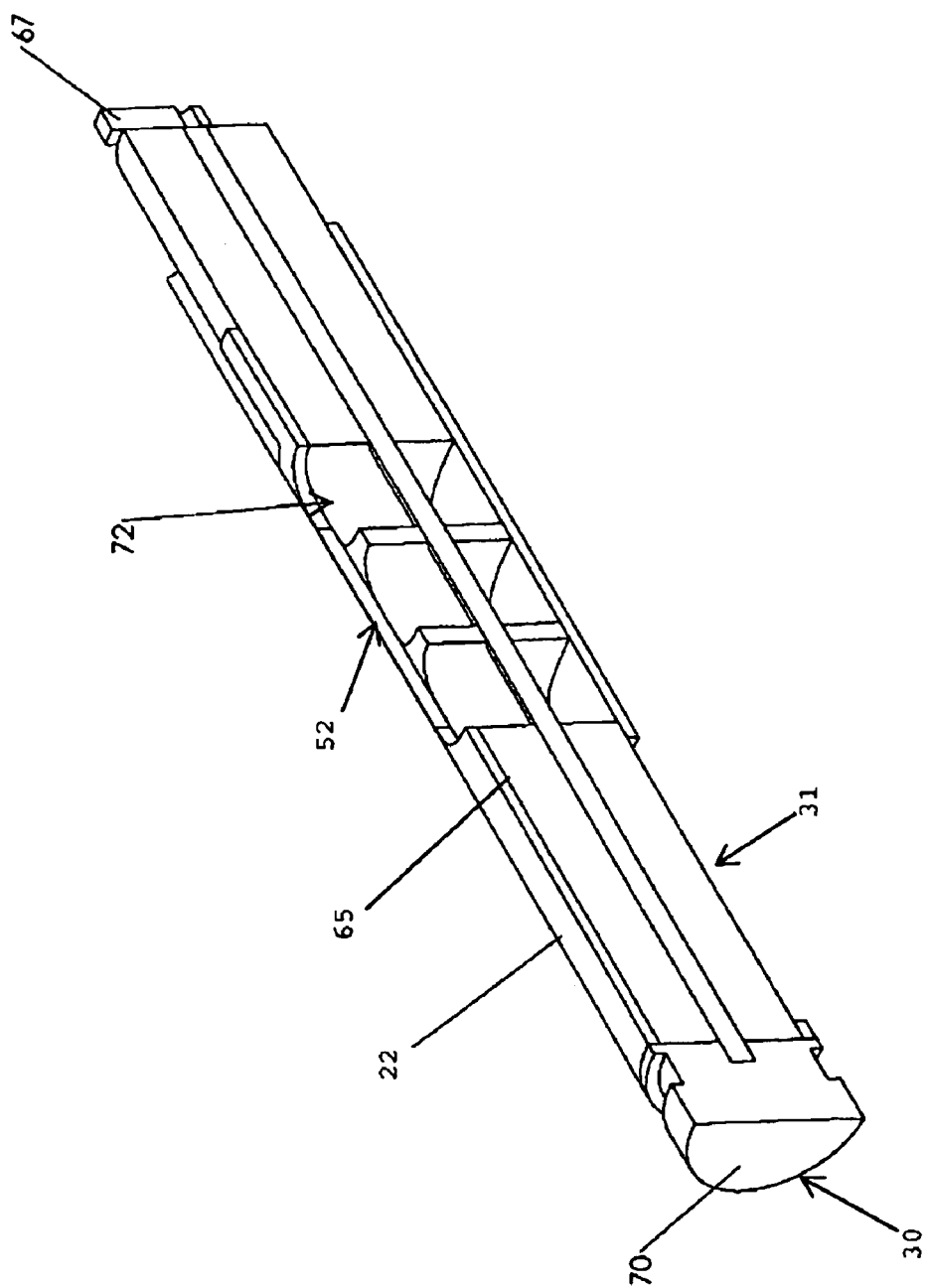
FIG. 5 is a cross sectional view of the tube housing and dispensing tube of FIG. 4 taken along line 5-5.

FIGS. 3-5 show the tube housing 22 is shown in more detail. As can be seen in FIGS. 3-5, the tube housing 22 is generally cylindrical in shape and includes a front opening 18, a rear opening 27 and an internal volume 24 disposed therebetween. As shown in FIGS. 3-5, the internal volume 24 is occupied by the dispensing tube 30.

The tube housing 22 further includes a bottom opening 31 and a top opening 52. The bottom opening 31 dispenses powder material (not shown) from the dispensing tube 30 to a container (not shown). The top opening 52 is in fluid communication between the internal volume 24 and the upper cavity 50. The top opening 52 is configured to permit powder material to flow into the dispensing tube 30 when the dispensing tube 30 is positioned in a fill position as shown FIGS. 1 and 2.

The rear opening 27 is in fluid communication between the internal volume 24 and the lower cavity 40. The rear opening 27 includes a recess 80. The recess 80 includes a first stop surface 81, a second stop surface 82 and a third stop surface 83.

The tube housing 22 also includes an indicator feature 41. The indicator feature 41 is configured to correspond to a position feature 74 on the dispensing tube 30 to indicate the position of the dispensing tube 30 within the housing, as is discussed in more detail below. The indicator feature 41 may include reference numerals, colors, or other indicia of position. In another embodiment, the indicator feature 41 may be omitted.

The tube housing 22 further includes a flow control feature 33. The flow control feature 33 includes an inclined panel 34 and a side panel 36. The flow control feature 33 is configured to direct a powder material (not shown) dispensing from the dispensing tube 30 through the bottom opening 31 to a container (not shown). In another embodiment, the flow control feature 33 may have other geometries, including but not limited to, a conical geometry.

Referring to FIGS. 1-5, the dispensing tube 30 has a generally cylindrical shape and includes a tube body 65, a stop feature 67, an attachment rod 68, and a knob 70. In this exemplary embodiment, the knob 70 is a separate component attached to the tube body 65. The knob 70 may be attached to the tube body 65 and/or attachment rod 68. The knob 70 may be attached by adhesive bonding, thermal welding, using fasteners or other similar attachment methods as would be appreciated by one of ordinary skill in the art. The knob 70 may include a friction feature (not shown) to assist an operator in mechanically rotating the knob 70. The friction feature may include a roughened surface, ridges, protrusions, other similar features and combinations thereof. The knob 70 may further include indicia (not shown) that indicate the relative rotational position of the dispending tube 30 in the tube housing 22. In another embodiment, the knob 70 may be formed integrally with the tube body 65.

The attachment rod 68 is disposed axially through the tube body 65. The attachment rod 68 provides attachment points for knob 70 and stop feature 67. In another embodiment, the attachment rod 68 may be omitted.

The stop feature 67 is attached to the tube body 65 and/or attachment rod 68. The stop feature 70 may be attached by adhesive bonding, thermal welding, using fasteners or other similar attachment methods as would be appreciated by one of ordinary skill in the art.

The tube body 65 includes a plurality of recesses 72 and a position feature 74. The plurality of recesses 72 are generally cylindrical in shape and have a predetermined volume. As can be seen in FIGS. 1-5, the plurality of recesses 72 pass through the tube body 65. The plurality of recesses 72 may be formed in the tube body 65 when the tube body 65 is formed. In another embodiment, the plurality of recesses 72 may be formed into the tube body 65 by drilling, grinding or other similar material removal method.

In this exemplary embodiment, the tube body 25 includes three recesses 72. For convenience, the recesses 72 have been consecutively number first recess 1, second recess 2 and third recess 3 as shown in FIGS. 3 and 4. In another embodiment, the tube body 65 may include one or more recesses 72. In this exemplary embodiment, each recess 72 has an equal volume of 1 tablespoon or 14.8 ml. In another embodiment, the volume of any one of the recesses 72 may vary. In still another embodiment, the volume of at least two of the recesses 72 may be equal.

Referring again to FIGS. 3-5, the first stop surface 81, second stop surface 82 and third stop surface 83 of the recess 41 are configured to permit the dispensing tube 30 to be rotated and withdrawn from the tube housing 22 at predetermined distances to position any number of the plurality of recesses 72 over the bottom opening 31 to dispense a predetermined amount of power material (not shown) from the powder dispenser 10 (FIGS. 1 and 2). When the dispensing tube 30 is withdrawn from the tube housing 22 by a predetermined distance, the mechanical stop 67 contacts with the first stop surface 81. At this point, the first recess 1 is positioned and aligned over the bottom opening 31 and the powder material of the first recess 1 is dispensed from the powder dispenser 10. The knob 70 may then be rotated counter-clockwise as about axis A (FIG. 3) until the mechanical stop 67 is no longer in contact with the first stop 81. At this position, the dispensing tube 30 may be further withdrawn from the tube housing 22 until the mechanical stop 67 contacts the second stop 82. At this point, the second recess 2 is positioned and aligned over the bottom opening 31 and the contents of the second recess 2 are dispensed from the powder dispenser 10. The knob 70 may then be further rotated counter-clockwise until the mechanical stop 67 is no longer in contact with the second stop 82 and the dispensing tube 30 may be further withdrawn until the mechanical stop 67 contacts the third stop 83. At this point, the third recess 3 is positioned and aligned over the bottom opening 31 and the contents of the third recess 3 are dispensed from the powder dispenser 10. In another embodiment, the dispensing tube 30 is rotated clockwise, and the stop recess 81 is correspondingly configured to allow the dispensing tube 30 to be withdrawn at predetermined distances as would be appreciated by one of ordinary skill in the art.

The distance that the dispensing tube 30 is withdrawn from the tube housing 22 is indicated by position feature 74, which is correlated to corresponding indicator feature 41 on the tube housing 22 to show the position of which of the plurality of recesses 72 are located over the bottom opening 31. In addition, additional indicia (not shown) may be used on powder dispenser 10 to assist an operator in dispensing powder material.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A powder dispenser for dispensing a predetermined volume of a powder product, comprising:
   a housing having an upper cavity and a lower cavity;
   a hopper at least partially defining a bottom surface of the upper cavity;
   an opening in the hopper;
   a tube housing comprising a top opening in fluid communication with the opening of the hopper and a bottom opening;
   a dispensing tube disposed within the tube housing, the dispensing tube comprising a plurality of recesses having a predetermined volume;
   wherein the dispensing tube and tube housing are configured to dispense a predetermined volume of a powder product when the dispensing tube is withdrawn from the tube housing a predetermined distance; and
   wherein the dispensing tube further comprises a mechanical stop and the tube housing comprises a recess having at least one stop surface, the mechanical stop and the at least one stop surface are configured to permit the dispensing tube to be withdrawn from the tube housing a predetermined distance; and
   wherein the at least one stop surface comprises three stop surfaces configured to permit the dispensing tube to be withdrawn three predetermined distances.

2. The powder dispenser of claim 1, wherein each distance of the three predetermined distances correspond to dispensing powder material from each of three corresponding recesses in the dispensing tube.

3. The powder dispenser of claim 1, wherein each recess of the plurality of recesses has an equal predetermined volume.

4. The powder dispenser of claim 1, wherein the powder food disperser is formed of a transparent polymer material.

5. The powder dispenser of claim 1, further comprising a lid attached to the housing that provides access to the upper cavity.

6. The powder dispenser of claim 1, wherein the lower cavity has an opening configured to provide access for storing containers in the lower cavity.

7. The powder dispenser of claim 1, wherein the lower cavity is configured to store baby formula bottles.

8. A method of dispensing a predetermined volume of a powder product, comprising:
   providing a powder dispenser comprising
      a housing having an upper cavity and a lower cavity;
      a hopper at least partially defining a bottom surface of the upper cavity;
      an opening in the hopper;
      a tube housing comprising a top opening in fluid communication with the opening of the hopper and a bottom opening; and
      a dispensing tube disposed within the tube housing, the dispensing tube comprising a plurality of recesses having a predetermined volume and a stop feature;
   withdrawing the dispensing tube from the tube housing a first predetermined distance to dispense a first predetermined volume of a powder product from the powder dispenser;
   wherein rotating the dispensing tube and withdrawing the dispensing tube a second predetermined distance to dispense a second predetermined volume of powder product from the powder dispenser; and
   wherein the stop feature contacts a second stop surface of the recess when withdrawn the second predetermined distance.

9. The method of claim 8, wherein the stop feature contacts a first stop surface of a recess of the tube housing when withdrawn the first predetermined distance.

10. The method of claim 8, further comprising:
    rotating the dispensing tube and withdrawing the dispensing tube a third predetermined distance to dispense a third predetermined volume of powder product from the powder dispenser.

11. The method of claim 10, wherein the dispensing tube contacts a third stop surface of the recess when withdrawn the third predetermined distance.

* * * * *